US010278130B2

(12) United States Patent
Yang et al.

(10) Patent No.: US 10,278,130 B2
(45) Date of Patent: Apr. 30, 2019

(54) SEARCH, MEASUREMENTS, AND POSITIONING WITH AID OF MOTION DETECTION INFORMATION

(71) Applicant: QUALCOMM Incorporated, San Diego, CA (US)

(72) Inventors: Yue Yang, San Diego, CA (US); Aziz Gholmieh, Del Mar, CA (US); Arvind Vardarajan Santhanam, San Diego, CA (US); Srinivasan Balasubramanian, San Diego, CA (US); Frank Xiaoyu Hu, San Diego, CA (US); Huilin Xu, San Diego, CA (US); Xu Han, San Diego, CA (US); Ranjan Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 15/139,154

(22) Filed: Apr. 26, 2016

(65) Prior Publication Data

US 2017/0311266 A1 Oct. 26, 2017

(51) Int. Cl.
*H04W 52/02* (2009.01)
*H04W 4/02* (2018.01)
(Continued)

(52) U.S. Cl.
CPC ......... *H04W 52/0261* (2013.01); *H04W 4/02* (2013.01); *H04W 48/16* (2013.01);
(Continued)

(58) Field of Classification Search
CPC ............. H04W 36/0088; H04W 52/02; H04W 52/0254; H04W 52/0261; H04W 4/02;
(Continued)

(56) References Cited

U.S. PATENT DOCUMENTS 6,608,858 B1 * 8/2003 Sih ...................... H04B 1/7087
375/147
9,179,328 B2 11/2015 Li et al.
(Continued)

FOREIGN PATENT DOCUMENTS

EP 2197232 A1 6/2010
EP 2533579 A2 12/2012
(Continued)

OTHER PUBLICATIONS

International Search Report and Written Opinion—PCT/US2017/023847—ISA/EPO—dated Aug. 2, 2017.
(Continued)

*Primary Examiner* — Raymond S Dean
(74) *Attorney, Agent, or Firm* — Patterson & Sheridan, LLP

(57) ABSTRACT

Certain aspects of the present disclosure generally relate to enhanced procedures for search, measurement, and positioning with aid of motion detection information. According to certain aspects, a method is provided for wireless communications which may be performed, for example, by a user equipment (UE). The method generally includes determining one or more parameters of the UE; dynamically adjusting a periodicity of at least one of: cell search and measurements or global positioning system (GPS) signal acquisition based, at least in part, on the one or more parameters; and performing at least one of: the cell search and measurements or GPS signal acquisition according to the adjusted periodicity. In aspects, an enhanced technique for motion state detection is provided. The method may result in power savings, for example, when the UE is stationary and can reduce the periodicity that the UE performs search, measurement and GPS signal acquisition.

24 Claims, 8 Drawing Sheets

(51) Int. Cl.
*H04W 48/16* (2009.01)
*H04W 64/00* (2009.01)
*G01S 19/34* (2010.01)
*H04L 12/28* (2006.01)
*H04W 84/12* (2009.01)

(52) U.S. Cl.
CPC ..... *H04W 52/0254* (2013.01); *H04W 64/006* (2013.01); *G01S 19/34* (2013.01); *H04L 12/2854* (2013.01); *H04W 84/12* (2013.01); *Y02D 70/1242* (2018.01); *Y02D 70/1244* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/24* (2018.01); *Y02D 70/26* (2018.01)

(58) Field of Classification Search
CPC ... H04W 64/006; H04W 84/12; H04W 48/16; Y02B 60/50; H04L 12/2854; G01S 19/34; Y02D 70/24; Y02D 70/26; Y02D 70/142; Y02D 70/146; Y02D 70/164; Y02D 70/1242; Y02D 70/1244; Y02D 70/1262; Y02D 70/1264
USPC .......................................... 455/574; 370/311
See application file for complete search history.

(56) References Cited

U.S. PATENT DOCUMENTS

| | | | |
|---|---|---|---|
| 9,239,376 | B2 | 1/2016 | Mathews et al. |
| 2010/0304761 | A1 | 12/2010 | Seibert et al. |
| 2010/0328154 | A1* | 12/2010 | Kupfer ............ G01S 19/48 342/357.74 |
| 2011/0117856 | A1 | 5/2011 | Veluppillai et al. |
| 2012/0258755 | A1* | 10/2012 | Harju ............ H04W 36/0088 455/517 |
| 2013/0258876 | A1* | 10/2013 | Damji ............ H04W 52/0254 370/252 |
| 2014/0003259 | A1 | 1/2014 | Chin et al. |
| 2014/0288867 | A1 | 9/2014 | Karlsson et al. |
| 2015/0031349 | A1* | 1/2015 | Hill ................ H04M 1/72577 455/418 |
| 2015/0131461 | A1 | 5/2015 | Ramkumar et al. |
| 2015/0350976 | A1 | 12/2015 | Kodali et al. |
| 2016/0088564 | A1 | 3/2016 | Ahmadzadeh et al. |

FOREIGN PATENT DOCUMENTS

| | | |
|---|---|---|
| EP | 2632205 A1 | 8/2013 |
| WO | WO-2012046999 A2 | 4/2012 |
| WO | WO-2013169789 A1 | 11/2013 |
| WO | WO-2015138859 A1 | 9/2015 |

OTHER PUBLICATIONS

Partial International Search Report—PCT/US2017/023847—ISA/EPO—dated Jun. 13, 2017.

* cited by examiner

CRS = Cell-Specific Signal
PRS = Positioning Reference Signal

SEARCH, MEASUREMENTS, AND POSITIONING WITH AID OF MOTION DETECTION INFORMATION

FIELD OF THE DISCLOSURE

Certain aspects of the present disclosure relate generally to wireless communication systems, and more specifically, to enhanced procedures for search, measurement, and positioning with aid of motion detection information.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. UMTS also supports enhanced 3G data communications protocols, such as High Speed Downlink Packet Data (HSDPA), which provides higher data transfer speeds and capacity to associated UMTS networks.

In addition to operation in wireless telecommunication systems in which wireless service is afforded through disparate base stations, a UE can consume data related to various services such as location-based services. Based on technology or provisioning settings (e.g., enabled functionality) of the UE, position of the UE can be estimated at least in part by the UE through global positioning system (GPS) system data received from a plurality of satellites, or from control signaling received from a plurality of base stations. In 3GPP LTE networks, such control signaling data includes positioning reference signal (PRS), which is transmitted by the plurality of base stations and received by the UE. In conventional telecommunication systems, decoding of PRS sequences of reference symbols at the receiver generally results in secondary correlation peaks. Such secondary correlation peaks can affect determination of time-of-flight intervals that are part of process(es) (e.g., trilateration, triangulation, etc.) to produce an estimate of location of the UE.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and user terminals in a wireless network.

Certain aspects of the present disclosure generally relate to enhanced procedures for search, measurement, and positioning with aid of motion detection information.

According to certain aspects, a method for wireless communications by a user equipment (UE) is provided. The method generally includes determining one or more parameters of the UE; dynamically adjusting a periodicity of at least one of: cell search and measurements or global positioning system (GPS) signal acquisition, based at least in part, on the one or more parameters; and performing at least one of: cell search and measurement or GPS signal acquisition according to the adjusted periodicity.

According to certain aspects, an apparatus for wireless communications by a UE is provided. The apparatus generally includes means for determining one or more parameters of the UE; means for dynamically adjusting a periodicity of at least one of: cell search and measurements or GPS signal acquisition, based at least in part, on the one or more parameters; and means for performing at least one of: cell search and measurement or GPS signal acquisition according to the adjusted periodicity.

According to certain aspects, an apparatus for wireless communications by a UE is provided. The apparatus generally includes at least one processor configured to determine one or more parameters of the UE; dynamically adjust a periodicity of at least one of: cell search and measurements or GPS signal acquisition, based at least in part, on the one or more parameters; and perform at least one of: cell search and measurement or GPS signal acquisition according to the adjusted periodicity and a memory coupled with the at least one processor.

According to certain aspects, a computer readable medium having computer executable code stored thereon is provided. The computer executable code generally includes code for determining one or more parameters of a UE; code for dynamically adjusting a frequency of at least one of: cell search and measurements or GPS signal acquisition, based at least in part, on the one or more parameters; and code for performing at least one of: cell search and measurement or GPS signal acquisition according to the adjusted periodicity.

Numerous other aspects are provided including apparatus, systems and computer program products. To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Certain aspects of the present disclosure generally relate to enhanced procedures for search, measurement, and positioning with aid of motion detection information. For example, a user equipment (UE) can dynamically adjust the periodicity at which the UE performs search and measurements and/or global positioning system (GPS) signal acquisition based on whether the UE is stationary, a duration the UE is in a stationary state, battery life of the UE, and channel quality. This may reduce power consumption due to the search, measurement, and GPS signal acquisition at times when the search, measurement, and GPS signal acquisition may not be useful, for example, since the UE is stationary. Aspects herein also provide enhanced techniques for determining the mobility state of the UE by using filtered frequency error and/or Doppler value in addition to motion sensor information.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An Orthogonal Frequency Division Multiple Access (OFDMA) network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). LTE generally refers to both LTE and LTE-A. The techniques described herein may be used for the wireless networks and radio technologies mentioned above as well as other wireless networks and radio technologies. For clarity, certain aspects of the techniques are described below for LTE, and LTE terminology is used in much of the description below.

It is noted that while aspects may be described herein using terminology commonly associated with 3G and/or 4G wireless technologies, aspects of the present disclosure can be applied in other generation-based communication systems, such as 5G and later.

Figure 1:
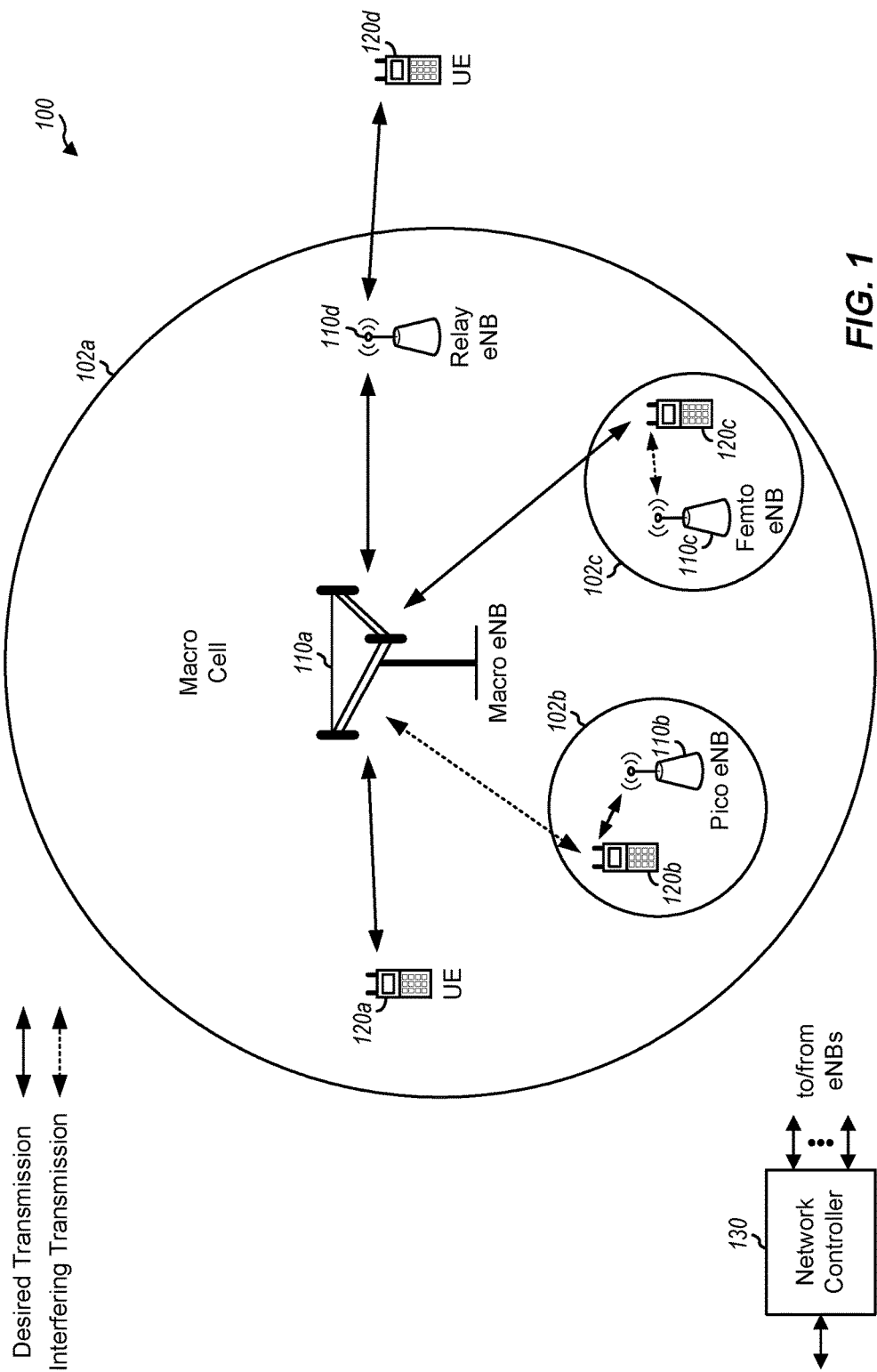
FIG. 1 is a block diagram conceptually illustrating an example of a telecommunications system, in accordance with certain aspects of the present disclosure.

FIG. 1 shows a wireless communication network 100, in which aspects of the present disclosure for search, measurement, and positioning with aid of motion detection information may be performed. For example, the UE 120 (e.g., 120a, 120b, 120c) can dynamically adjust the periodicity at which the UE performs search and measurements and/or global positioning system (GPS) signal acquisition based on parameters including whether the UE 120 is stationary, a duration the UE is in a stationary state, battery life of the UE 120, and/or channel quality.

The wireless communication network 100 may be a wireless wide area network (WWAN), such as an LTE network or some other wireless network, for example, a wireless local area network (WLAN), such as Wi-Fi. The wireless communication network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

UEs 120 (e.g., 120a, 120b, 120c) may be dispersed throughout wireless communication network 100, and each UE may be stationary or mobile. For example, UE 120*a* may be within the coverage of macro eNB 110, UE 120*b* may be within the coverage of pico eNB 110*b*, and UE 120*c* may be within the coverage of femto eNB 110*c*. A UE may also be referred to as an access terminal, a terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, navigation devices, gaming devices, cameras, a vehicular device, a drone, a robot/robotic device, a wearable device (e.g., smart watch, smart clothing, smart wristband, smart ring, smart bracelet, smart glasses, virtual reality goggles), etc.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE (e.g., 120*a*, 120*b*, 120*c*) that can relay transmissions for other UEs. In the example shown in FIG. 1, a relay station 110*d* may communicate with macro eNB 110*a* and a UE 120*d* in order to facilitate communication between eNB 110*a* and UE 120*d*. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless communication network 100, and each UE may be stationary or mobile. A UE may also be referred to as a terminal, a user terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a netbook, a smartbook, an ultrabook, a wearable device (e.g., smart glasses, smart watch, smart wrist band, smart ring, smart bracelet, smart clothing), a drone, a robot, a meter, a monitor, a sensor, and etc.

Figure 2:
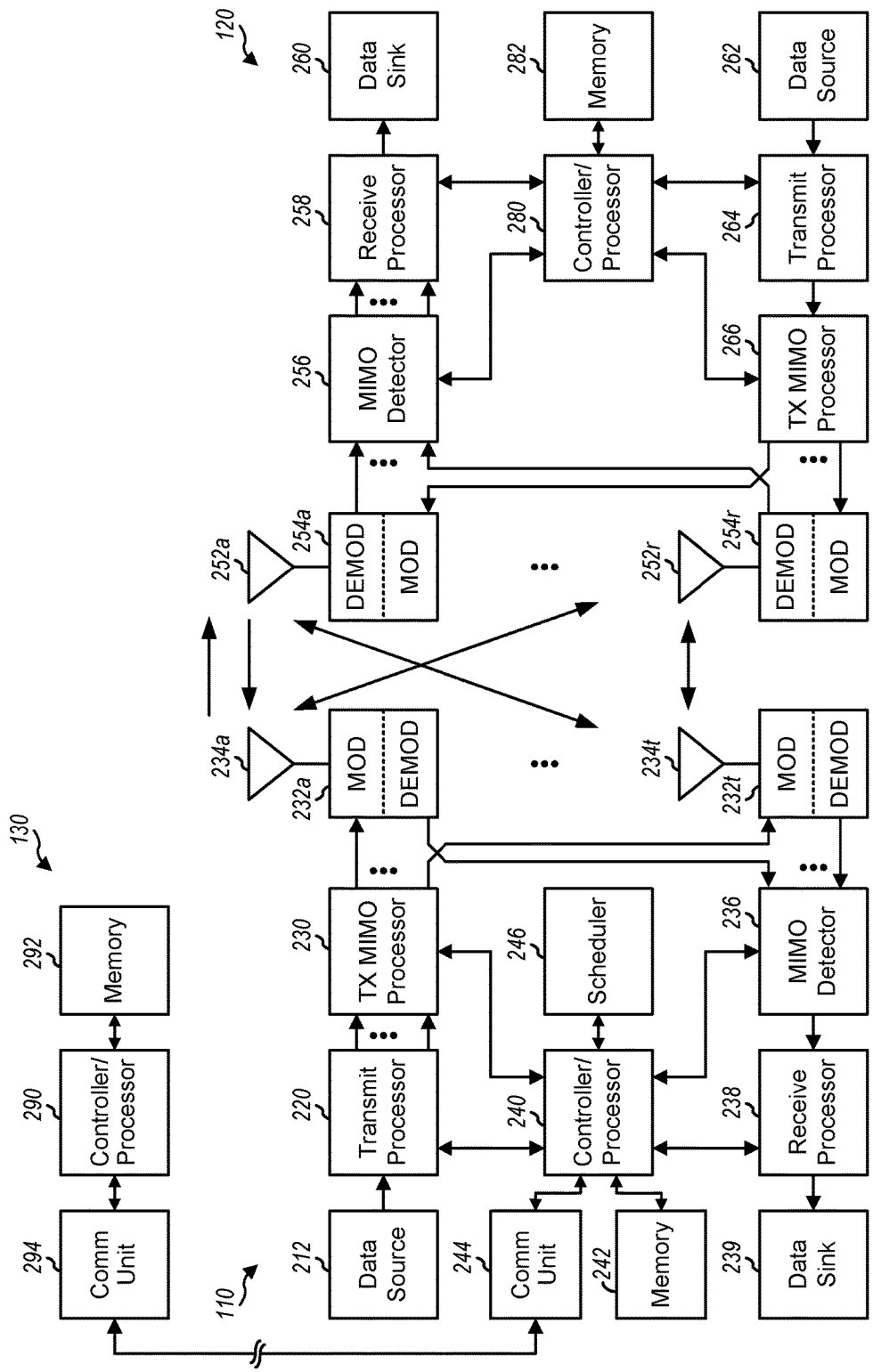
FIG. 2 is a block diagram conceptually illustrating an example of a Node B in communication with a user equipment (UE) in a telecommunications system, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234*a* through 234*t*, and UE 120 may be equipped with R antennas 252*a* through 252*r*.

At base station 110, a transmit processor 220 may receive data from a data source 212 for one or more UEs, select one or more modulation and coding schemes (MCS) for each UE based on channel quality information (CQIs) received from the UE, process (e.g., encode and modulate) the data for each UE based on the modulation and coding scheme selected for the UE, and provide data symbols for all UEs. Transmit processor 220 may also process system information and control information (e.g., CQI requests, grants, upper layer signaling, etc.) and provide overhead symbols and control symbols. Processor 220 may also generate reference symbols for reference signals (e.g., the cell-specific reference signals) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280.

On the uplink, at UE 120, a transmit processor 264 may receive and process data from a data source 262 and control information from controller/processor 280. Processor 264 may also generate reference symbols for one or more reference signals. The symbols from transmit processor 264 may be precoded by a TX MIMO processor 266 if applicable, further processed by modulators 254*a* through 254*r* (e.g., for single-carrier frequency division multiplexing (SC-FDM), orthogonal frequency division multiplexing (OFDM), etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 280 and/or other processors and modules at UE 120 may perform or direct operations for search, measurement, and GPS acquisition with aid of motion detection information, as described herein. For example, controller/processor 280 and/or other processors and modules at UE 120 may perform or direct operations for various procedures, such as the operations 600 illustrated in connection with FIG. 6. Memory 282 may store data and program codes for UE 120. For example, controller/processor 240 and/or other processors and modules at base station 110 may perform or direct operations for various procedures. Memory 242 may store data and program codes for base station 110. A scheduler 246 may schedule UEs for data transmission on the downlink and/or uplink. Network controller 130 may include, for example, memory 292, controller/processor 290, and communications unit 294. In accordance with certain aspects of the present disclosure, the UE 120 may include a GPS receiver configured to acquire and/or processor GPS signals from GPS satellites. The UE 120 may include a motion sensor configured to sense when the UE is in motion.

Figure 3:
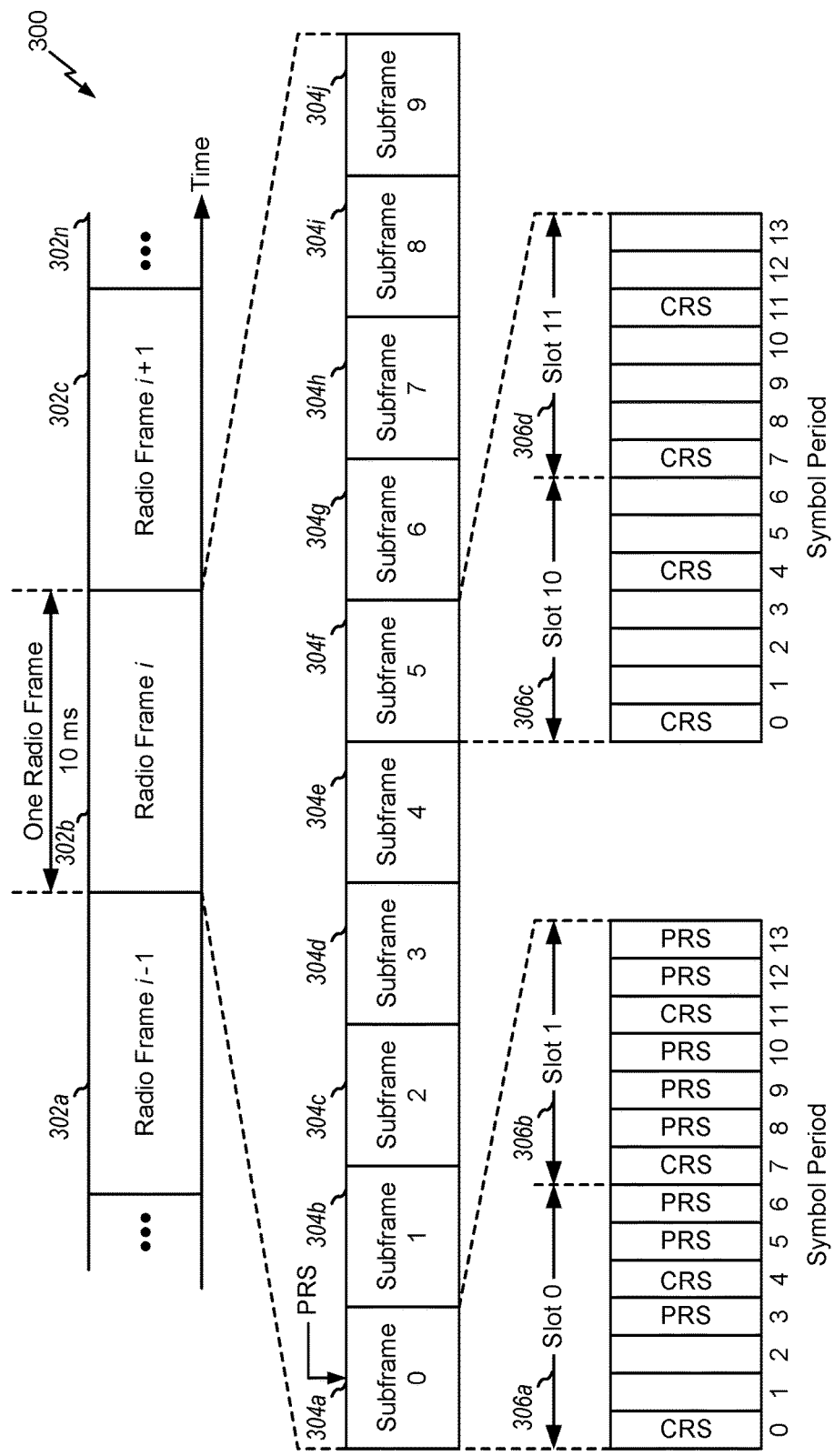
FIG. 3 illustrates an example frame structure, in accordance with certain aspects of the present disclosure.

FIG. 3 shows an exemplary frame structure 300 for FDD in LTE. The transmission timeline for each of the downlink and uplink may be partitioned into units of radio frames (e.g., radio frames 302*a*, 302*b*, 302*c*, . . . 302*n*). Each radio frame may have a predetermined duration (e.g., 10 milliseconds (ms)) and may be partitioned into 10 subframes with indices of 0 through 9. For example, as shown in FIG. 3, the radio frame 302*b* is partitioned into subframes 304*a*-304*j*. Each subframe may include two slots. For example, as shown in FIG. 3, the subframe 304*a* includes slot 306*a* (Slot 0) and slot 306*b* (Slot 1) and the subframe 304*f* includes slot 306*c* (Slot 10) and slot 306*d* (Slot 11). Each radio frame may thus include 20 slots with indices of 0 through 19. Each slot may include L symbol periods, e.g., seven symbol periods for a normal cyclic prefix or six symbol periods for an extended cyclic prefix. The 2L symbol periods in each subframe may be assigned indices of 0 through 2L−1. For example, as shown in FIG. 3, slots 306*a*, 306*b*, 306*c*, and 306*d* each includes 7 symbols.

LTE utilizes OFDM on the downlink and SC-FDM on the uplink. OFDM and SC-FDM partition a frequency range into multiple ($N_{FFT}$) orthogonal subcarriers, which are also commonly referred to as frequency tones, tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.4, 3, 5, 10 or 20 megahertz (MHz), respectively.

The time-frequency resources available for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

FIG. 3 shows transmission of reference signals in LTE, according to aspects of the present disclosure. A cell may transmit a cell-specific reference signal (CRS) in certain symbol periods of each subframe. For example, as shown in FIG. 3, the CRS can be transmitted in the first and fifth symbols of slots 306*a*-306*d*. The cell may transmit a positioning reference signal (PRS) in certain symbol periods of certain subframes. For example, as shown in FIG. 3, the CRS can be transmitted in the symbols 3, 5, and 6 of slots 306*a* and symbols 8, 9, 10, 12, and 13 of slot 306*b*. The CRS and PRS may be specific for the cell and may be generated based on a cell identity (ID) of the cell. The CRS and PRS may be used for various purposes such as channel estimation, channel measurement, channel feedback reporting, etc.

Figure 4:
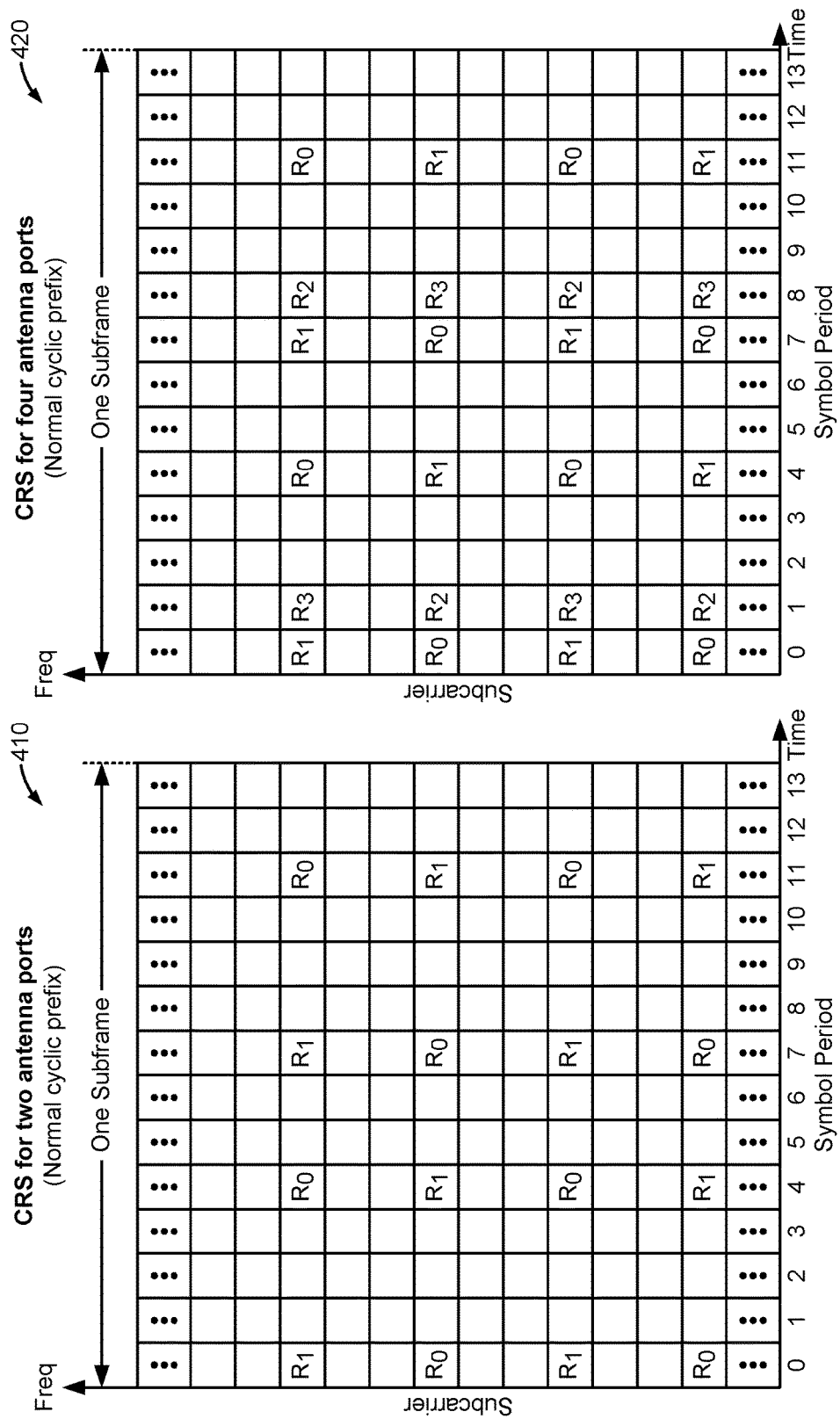
FIG. 4 illustrates example subframe formats for cell-specific reference signal (CRS) transmission, in accordance with certain aspects of the present disclosure.

FIG. 4 shows two subframe formats 410 and 420 for the CRS with the normal cyclic prefix in LTE, according to aspects of the present disclosure. Subframe format 410 may be used for a cell having two antenna ports. The cell may transmit a CRS in symbol periods 0, 4, 7 and 11. Subframe format 420 may be used by a cell having four antenna ports. The cell may transmit a CRS in symbol periods 0, 1, 4, 7, 8 and 11. For both subframe formats 410 and 420, for a given resource element with label $R_m$, a reference symbol may be transmitted on that resource element from antenna port m, and no modulation symbols may be transmitted on that resource element from other antenna ports. An antenna port may also be referred to as an antenna, an antenna element, etc. A cell may transmit the CRS on evenly spaced subcarriers in each symbol period in which the CRS is transmitted.

To gather information in order to determine a position location, a mobile device may receive timing signals from a satellite positioning system (SPS), such as, for example, a Global Positioning System (GPS). Such information may be utilized by the mobile station to determine the position location, or the mobile station may provide the information to the network entity for position location determination.

Figure 5:
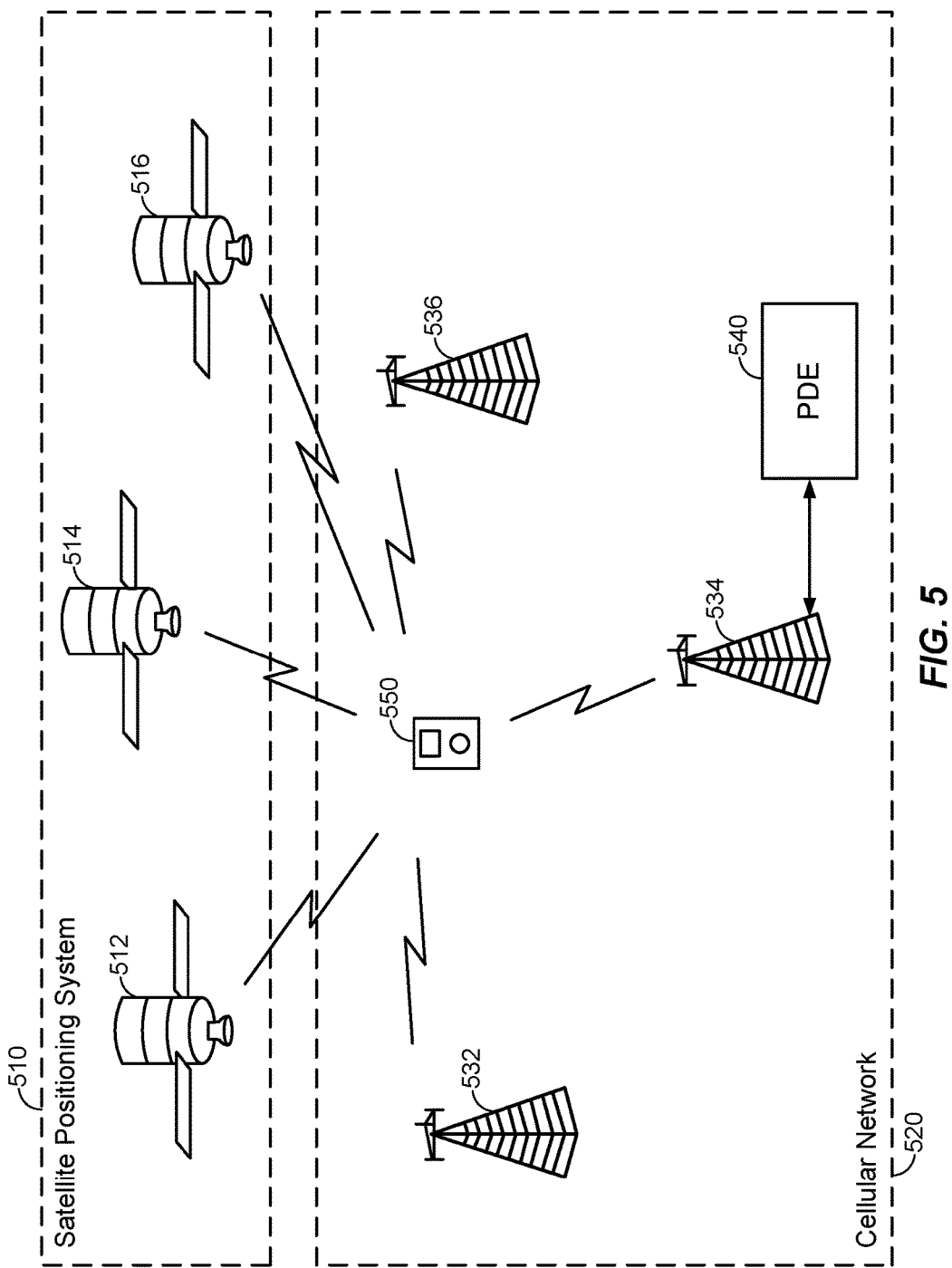
FIG. 5 is a block diagram of examples of a satellite positioning system (SPS) and a cellular network, in accordance with certain aspects of the present disclosure.

FIG. 5 is a diagram depicting an example cellular network 520 (which may be similar to the wireless communication network 100) and an example satellite positioning system (SPS) 510 in which aspects of the present disclosure may be performed. For example, the SPS 510 may be a GPS system and the mobile station 550 (which may be similar to the UE 120) may be equipped with a GPS receiver and a motion sensor. The mobile station 550 may perform GPS signal acquisition from the satellites 512, 514, and 516 at a periodicity that is based on a mobility state of the mobile station 550.

In an aspect, SPS 510 may comprise a number of satellites, for example satellites 512, 514, and 516. For an example, SPS 510 may comprise a GPS. Also for this example, cellular network 520 may transmit and/or receive signals that are compliant with and/or compatible with the LTE specification, although again, the scope of claimed subject matter is not limited in this respect. As used herein, the term "LTE compliant cellular network" or the like refer to a cellular system that may transmit and/or receive signals compliant with and/or compatible with the LTE specification. In an aspect, cellular network 520 may implement a subset of protocols compliant with and/or compatible with the LTE specification, and/or may implement modifications thereto. For one example, cellular network 520 may comprise base stations 532, 534, and 536. Of course, other examples may include additional numbers of base stations, and the configuration of base stations depicted in FIG. 5 is merely an example configuration. Further, as used herein, the term "base station" is meant to include any wireless communication station and/or device typically installed at a fixed location and used to facilitate communication in a cellular network. In another aspect, base stations may be included in any of a range of electronic device types. For one example, an access point may include a base station.

As used herein, the term "mobile station" (MS) refers to a device that may from time to time have a position location that changes. The changes in position location may comprise changes to direction, distance, orientation, etc., as a few examples. In particular examples, a mobile station may comprise a cellular telephone, wireless communication device, user equipment, laptop computer, other personal communication system (PCS) device, personal digital assistant (PDA), personal audio device (PAD), portable navigational device, and/or other portable communication devices. A mobile station may also comprise a processor and/or computing platform adapted to perform functions controlled by machine-readable instructions.

In one or more aspects, mobile station 550 may communicate with one or more of satellites 512, 514, and 516, as well as with one or more of base stations 532, 534, and 536.

For example, mobile station 550 may receive signal propagation delay information from one or more of the satellites and/or base stations. Mobile station 550 may calculate a position location for the mobile station based, at least in part, on the propagation delay information received through communication with one or more of the satellites 512, 514, and 516 and/or base stations 532, 534, and/or 536, and further based, at least in part, on known position locations of the base stations. Examples of measurements based on propagation delay information are provided in more detail below.

In another aspect, position location determination calculations may be performed by a network entity such as, for example, position determination entity 540 depicted in FIG. 5, rather than at mobile station 550. Such a calculation may be based, at least in part, on information gathered by mobile station 550 from one or more of the satellites 512, 514, and 516 and/or base stations 532, 534, and/or 536. In a further aspect, PDE 540 may transmit the calculated position location to mobile station 550.

In a further aspect, some position location implementations may comprise synchronous systems, and others may comprise asynchronous systems. As used herein, a synchronous system is one that performs position location measurements according to timing reference signals received from an SPS. Such systems may also utilize propagation delay information gathered from a cellular network. Asynchronous systems may lack timing reference signals as provided by an SPS, and may rely on position location measurement information gathered from a cellular network.

In order to perform trilateration, it may be advantageous for mobile station 550 to receive propagation delay information from at least three base stations, although more accurate position location determinations may be made if information is available from a larger number of cells.

Although FIG. 5 illustrates the SPS 510 communicates with the mobile station 550 in the cellular network 520, in other aspects, the SPS 510 can communicate with the mobile station 550 in different types of networks, for example, a WLAN (e.g., Wi-Fi).

Example Search, Measurements, and Positioning with Aid of Motion Detection Information A user equipment (UE) (e.g., such as UE 120) may be configured to perform search and measurement of neighboring cells. The UE may perform the search and measurement in idle mode or connected mode. The search can be inter-frequency or inter-RAT (radio access technology). The search and measurements may be used to periodically detect available neighbor cells (e.g., such as the cells 102a, 102b, and/or 102c) and monitor (e.g., measure) their channel quality. The detection of available neighbor cells and channel quality measurements can be used for a cell reselection or handover. For example, the UE may determine that the channel quality of a neighbor cell is better than channel quality of the current cell and may reselect or handover to the neighbor cell. Similarly, the UE can report channel quality measurements to the current cell and the current cell can instruct the UE to handover to the neighbor cell.

The periodicity at which the UE performs the search and measurement can be based on UE class, discontinuous reception (DRX) cycle length, channel quality, and other metrics. In one example, the periodicities and the associated metrics can be defined in the wireless standards.

The search and measurements consume power and drain battery life. In some scenarios, the search and measurements may not be useful and, therefore, can unnecessarily waste power consumption. For example, if the UE is stationary, channel quality can be expected to be stable for a duration and, therefore, a reselection or handover is not desirable if the channel condition for the current cell is satisfactory. Since reselection or handover is not needed, search and measurement are not useful.

In addition, the UE can use global positioning system (GPS) (e.g., such as the Satellite Positioning System (SPS) 510) to obtain location information. A GPS satellite (e.g., such as satellite 512, 514, and 516) may send a 50 bit signal per second. In order to obtain a precise location information, a GPS device associated with the UE acquires the signal from at least three GPS satellites at least every second. Therefore, for GPS positioning, the GPS receiver powers its receiver and processes the data 50 bit data from three satellites each second. For example, the UE can compare the signal arrival time from different satellites to determine the exact location. These GPS and processing operations also consume power and drain battery life. If the UE is stationary, it can be assumed that the location will not change and, therefore, the GPS signal acquisition and processing is unnecessary and wastes power consumption.

Accordingly, techniques for performing search and measurements and/or GPS acquisition taking into account motion detection information are desirable.

Techniques and apparatus are provided herein for enhanced procedures for search, measurement, and positioning with aid of motion detection information. For example, the UE can dynamically adjust the frequency at which the UE performs search and measurements and/or GPS signal acquisition based on whether the UE is stationary, a duration the UE is in a stationary state, battery life of the UE, and channel quality. This may reduce power consumption due to the search, measurement, and GPS signal acquisition at times when the search, measurement, and GPS signal acquisition may not be useful. Aspects herein also provide enhanced techniques for determining the mobility state of the UE by using filtered frequency error and/or Doppler value in addition to motion sensor information.

Figure 6:
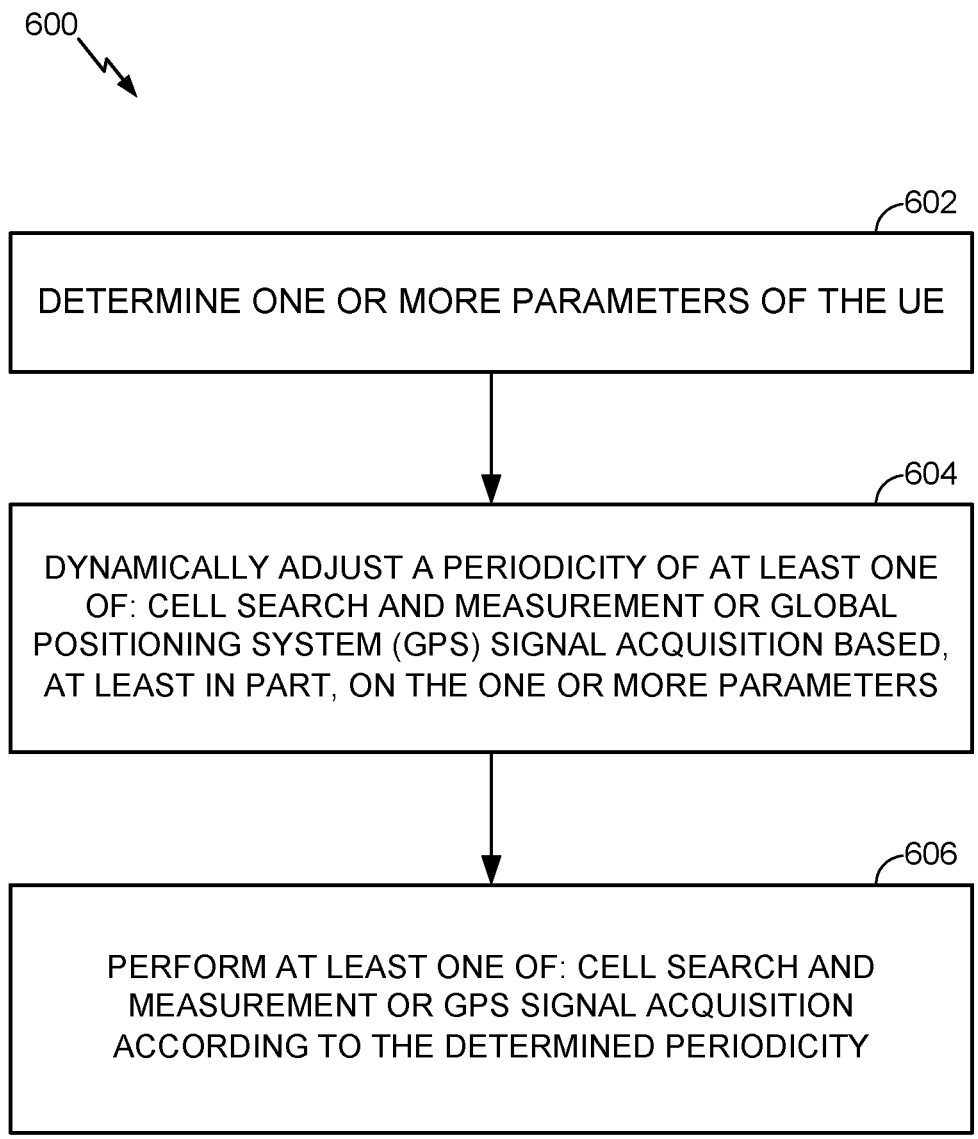
FIG. 6 illustrates example operations performed, for example, by a UE, in accordance with certain aspects of the present disclosure.

FIG. 6 illustrates example operations 600 that may be performed, for example, by a UE (e.g., such as UE 120), according to aspects of the present disclosure. The operations 600 may begin, at 602 by determining one or more parameters (e.g., channel quality, RAT, battery life, mobility state) of the UE. At 604, the UE dynamically adjusts a periodicity of at least one of: cell search and measurements or global positioning system (GPS) signal acquisition, based at least in part, on the one or more parameters. At 606, the UE performs at least one of: cell search and measurements or GPS signal acquisition according to the adjusted periodicity.

Figure 7:
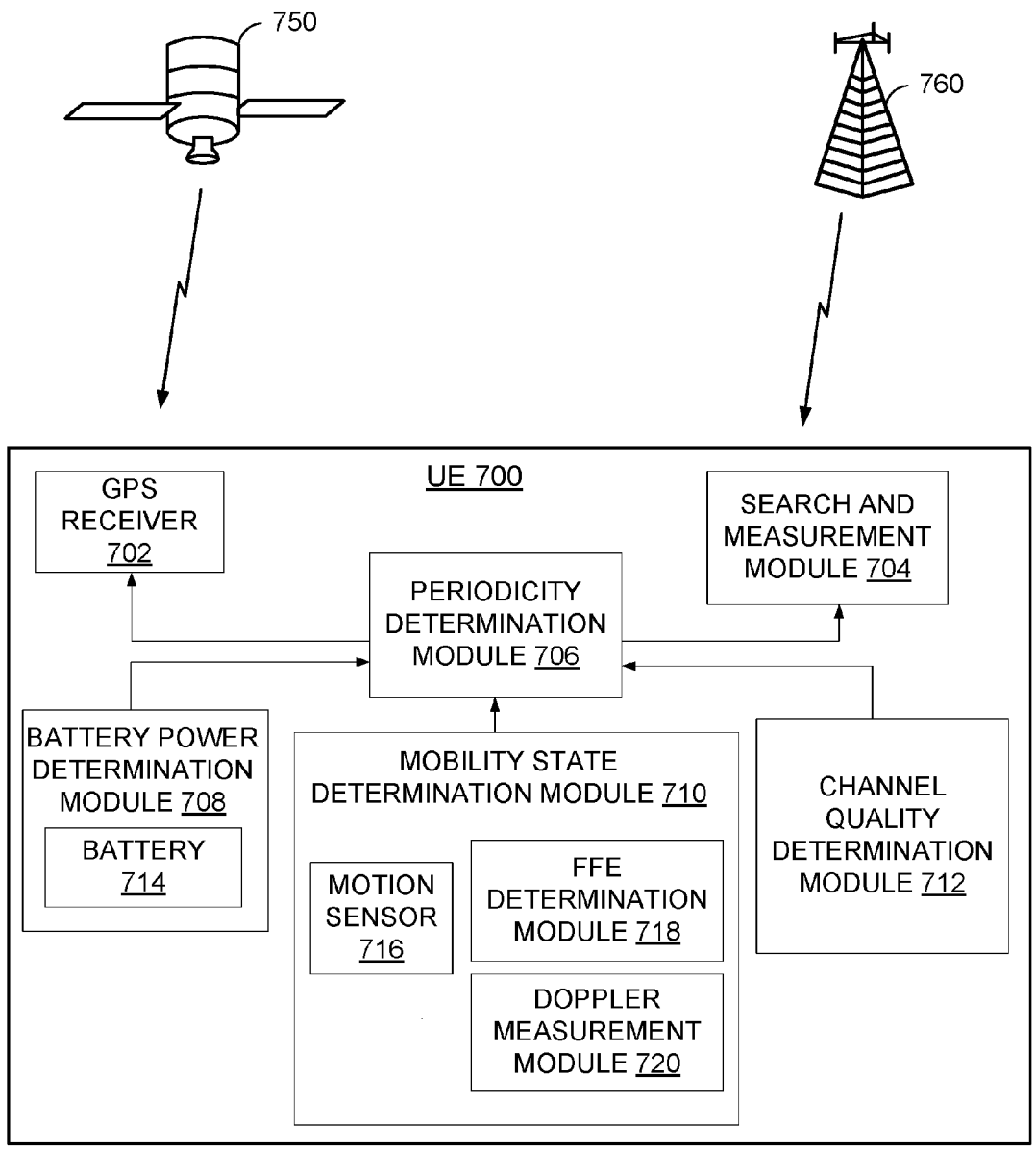
FIG. 7 is a block diagram conceptually illustrating an example UE capable of dynamically adjusting the periodicity of GPS signal acquisition and/or search and measurements, in accordance with certain aspects of the present disclosure.

FIG. 7 is a block diagram conceptually illustrating an example UE 700 capable of dynamically adjusting the periodicity of GPS signal acquisition and/or search and measurements, in accordance with certain aspects of the present disclosure. As shown in FIG. 7, the UE 700 can receive signals from satellite 750, which may be part of a GPS system (e.g., similar to SPS 510) and the UE 700 may also receive signals from other satellites in the GPS system. The UE 700 may also receive or detect signals from a base station 760 which may be part of communications network (e.g., such as wireless communication network 100) and the UE 700 may also receive or detect signals from other base station in the communications network.

As shown in FIG. 7, the UE 700 may include a GPS receiver 702 configured for acquiring/receiving GPS signals from the satellite 750 and a search and measurement module 704 for performing cell search and measurements. The UE 700 may include a periodicity determination module 706 that, as will described in more detail below, dynamically determines a periodicity for the GPS receiver 702 to acquire/receive GPS signals and/or for the search and measurement module 704 to perform cell search and measurements. As shown in FIG. 7, the periodicity determination module 706 can be based on input from the battery power determination module 708 (that can determine the power level of the battery 714), the channel quality determination module 712, and/or the mobility state determination module 710 (that determine a mobility state of the UE based on data from the motion sensor 716, the filter frequency error (FFE) module 718, and/or the Doppler measurement module 720).

Example Motion State Detection Enhancements

As mentioned above, the motion state (also referred to as the mobility state) of the UE (e.g., UE 700) may be used as an input (e.g., to the periodicity determination module 706) to evaluate the scenario and determine the frequency (e.g., periodicity) for performing search, measurements, and/or GPS signal acquisition. According to certain aspects of the present disclosure, techniques can be used to more accurately determine the motion state of the UE (e.g., in addition to using only motion sensor information). For example, the UE may use a combination of motion sensor information (e.g., from the motion sensor 716), a filtered frequency error (e.g., from the FFE determination module 718), and/or a Doppler measurement or UE speed (e.g., from the Doppler measurement module 720) to determine an adjustment for the frequency of performing search, measurement, and/or GPS signal acquisition.

The UE may include a motion sensor (e.g., motion sensor 716) that provides information regarding whether the UE is in motion (in a motion state) or stationary (in a stationary state). In some cases, the motion sensor may not be able to accurately detect the UE mobility state, for example, when the UE is moving smoothly (e.g., high speed train (HST) movement). Filtered frequency error and Doppler value measurements can be used to improve accuracy of motion state detection, for example, in these cases of smooth UE movement.

The filtered frequency error may indicate the total frequency tracking error sum. According to certain aspects, motion state detection can be enhanced by monitoring the filtered frequency error. For example, the filtered frequency error may show jumps (e.g., spikes on a graph of the FFE over time) when the UE is in HST movement and making a handover from one cell to another cell and/or when the UE is in HST motion and moving from one repeater to another. Therefore, by monitoring the filtered frequency error (e.g., at the FFE determination module 718), the UE may be able to determine that it is in HST motion when these jumps are observed in the filtered frequency error measurements and, accordingly, that UE is in a motion state.

According to certain aspects, the UE (e.g., UE 700) can enhance the accuracy of motion state detection with the motion sensor (e.g., motion sensor 716) by also performing Doppler estimation (e.g., at the Doppler measurement module 720). This may also be in addition to (or alternatively to) monitoring the filtered frequency error. For example, when the UE is moving at a high velocity, the measurement of Doppler shift may be high. Therefore, the UE may determine that it is in motion when the Doppler value estimation exceeds (e.g., satisfies) a pre-defined threshold.

According to certain aspects, by combining the motion sensor information, filtered frequency error monitoring, and/or Doppler value estimation, the UE may obtain accurate motion state detection to determine (e.g., at the mobility state determination module 710) the mobility state of the UE. As described herein, the mobility state information (e.g., along with other parameters) may be used by the UE (e.g., at the periodicity determination module 706) in dynamically adjusting the frequency that the UE performs search, measurements, and/or GPS signal acquisition.

According to certain aspects, the UE may also determine a duration of the mobility state of the UE, for example, how long the UE has been in a stationary state.

The techniques described herein for enhanced motion state detection may lead a more accurate motion state detection and, for example, the mobility state of the UE can be determined more quickly. For example, the filter frequency error monitoring or Doppler value estimation may indicate that the UE is in motion, even if the motion sensor does not detect the motion, such as may occur in the case HST movement.

Example Techniques for Dynamically Adjusting Frequency of Cell Search and Measurement According to certain aspects, dynamically adjusting the frequency (e.g., periodicity) of the search and measurements may include reducing the periodicity that UE performs search and measurements (e.g., the periodicity determination module 706 informs the search and measurement module 704 of the adjusted periodicity). In one example, the UE (e.g., UE 700) can adjust the frequency of search and measurements based on channel quality and mobility state (e.g., inputs from the channel quality determination module 712 and mobility state determination module 710). For example, if the UE is communicating (e.g., data and call) over a wireless local area network (WLAN) (e.g., Wi-Fi) with a base station (e.g., with base station 760), if the WLAN channel quality (e.g., determined at the channel quality determination module 712) is sufficient (e.g., good enough to support the communications) then the search and measurements may not be needed for cell reselection or handover due to poor channel quality. The sufficiency of the channel quality may be based on whether the channel quality satisfies a threshold. And if the UE is detected, for example, based the mobility state information (which may be determined according to the enhanced mobility state detection techniques described above), to be stationary (e.g., for a period of time), then the channel condition can be expected to remain satisfactory and, therefore, the search and measurements may be performed less frequently.

In another example, the UE may be communicating via a wireless wide area network (WWAN) (e.g., LTE), the channel quality is good enough (e.g., satisfies a higher threshold) or poor enough (e.g., fails to satisfy a lower threshold), and the UE is stationary for a duration, then the search and measurement could be less frequent. In this case, when the channel quality is poor, the UE may still reduce the frequency of search and measurements when the UE is stationary, because better LTE BSs may not be available.

In yet another example implementation, if the UE is detected to be stationary for a long duration (e.g., if the duration satisfies a threshold), then the search and measurements may be performed less frequently, regardless of the current channel quality or RAT.

For any of the example implementations describes above, the frequency of the search and measurements may be tapered (e.g., gradually reduced) as the duration that UE remains stationary increases.

According to certain aspects, the frequency of the search and measurements may be adjusted based on the battery life of the UE (e.g., determined at the battery power determination module 708). For example, if the UE battery (e.g., battery 714) power level is low enough (e.g., fails to satisfy a threshold), then the UE (e.g., UE 700) may reduce the search and measurements regardless of the current channel quality or the motion state of the UE.

According to certain aspects, using the techniques described herein, the power consumption for search and measurement may be lower when the UE is stationary than when the UE is not stationary; when the UE is WLAN than when the UE is not using a WLAN; and/or when the UE battery level is low than when the UE battery level is not low.

Example Techniques for Dynamically Adjusting Frequency of GPS Signal Acquisition According to certain aspects, the UE (e.g., UE 700) may include a GPS receiver (e.g., GPS receiver 702) configured to receive and/or process GPS signals from satellites (e.g., satellite 750) in the GPS. According to certain aspects, the frequency (e.g., the periodicity) of GPS signal acquisition (and processing) may be adjusted based on the UE motion state. For example, frequency of GPS signal acquisition may be reduced if the UE is detected to be in a stationary state (e.g., which may detected using the enhanced motion state detection techniques described above) for a duration. In an example implementation, the GPS receiver may be disabled (e.g., temporarily), until the motion state information indicates that the UE is mobile.

According to certain aspects, the GPS acquisition may be backed-off when the UE is stationary for a duration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members and duplicates of the same member. As an example, "at least one of: a, b, or c" is intended to cover: a, b, c, a-b, a-c, b-c, a-b-c, aa, bbb-c, aaa-bb-cccc, and etc. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The various operations or methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting may comprise a transmitter which may include the modulator(s) 254a-254r, antenna(s) 252a-252r, Transmit Processor 264, and/or TM MIMO Processor 266 of the user terminal 120 depicted in FIG. 2; and/or the modulator(s) 232a-232t, antenna(s) 234a-234t, Transmit Processor 230, and/or TX MIMO Processor 230 of the access point 110 shown in FIG. 2.

Means for receiving may comprise a receiver which may include the demodulator(s) 254a-254r, antenna(s) 252a-252r, Receive Processor 258, and/or MIMO Detector 256 of the user terminal 120 depicted in FIG. 2; and/or the demodulator(s) 232a-234t, antenna(s) 234a-234t, Receive Processor 238, and/or MIMO Detector 236 of the access point 110 shown in FIG. 2.

Means for processing, means for determining, means for dynamically adjusting, means for measuring, means for estimating, and/or means for disabling may comprise a processing system (e.g., TX MIMO Processor 230, Scheduler 246, Receive Processor 238, Controller/Processor 240, Transmit Processor 220, or combinations thereof, of the access point 110 shown in FIG. 2; and/or TX MIMO Processor 266, Transmit Processor 264, Controller/Processor 280, Receive Processor 258, or combinations thereof, of the user terminal 120 shown in FIG. 2).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 600 illustrated in FIG. 6, corresponds to means 600A illustrated in FIG. 6A.

The UE (e.g., UE 120 illustrated in FIGS. 1 and 2) may include components (means) for performing the operations described herein, such as the operations 600 illustrated in FIG. 6. Means for determining the one or more parameters of the UE, as illustrated in block 602A of FIG. 6A, may include means for determining a motion state of the UE which may include a motion sensor configured to detect whether the UE is moving or stationary, a module configured to determine a filtered frequency error at the UE relative to a base station, and/or a module configured to estimate a Doppler value for the UE. The means for determining the one or more parameters can include a means for determining a RAT on which UE is communication, which can include a module for receiving an indication of the RAT. The means for determining the one or more parameters can include a means for determining a channel quality, which may include modules for receiving transmissions over a channel and performing channel quality measurements. The means for determining the one or more parameters can include means for determining a battery life associated with the UE.

Figure 6A:
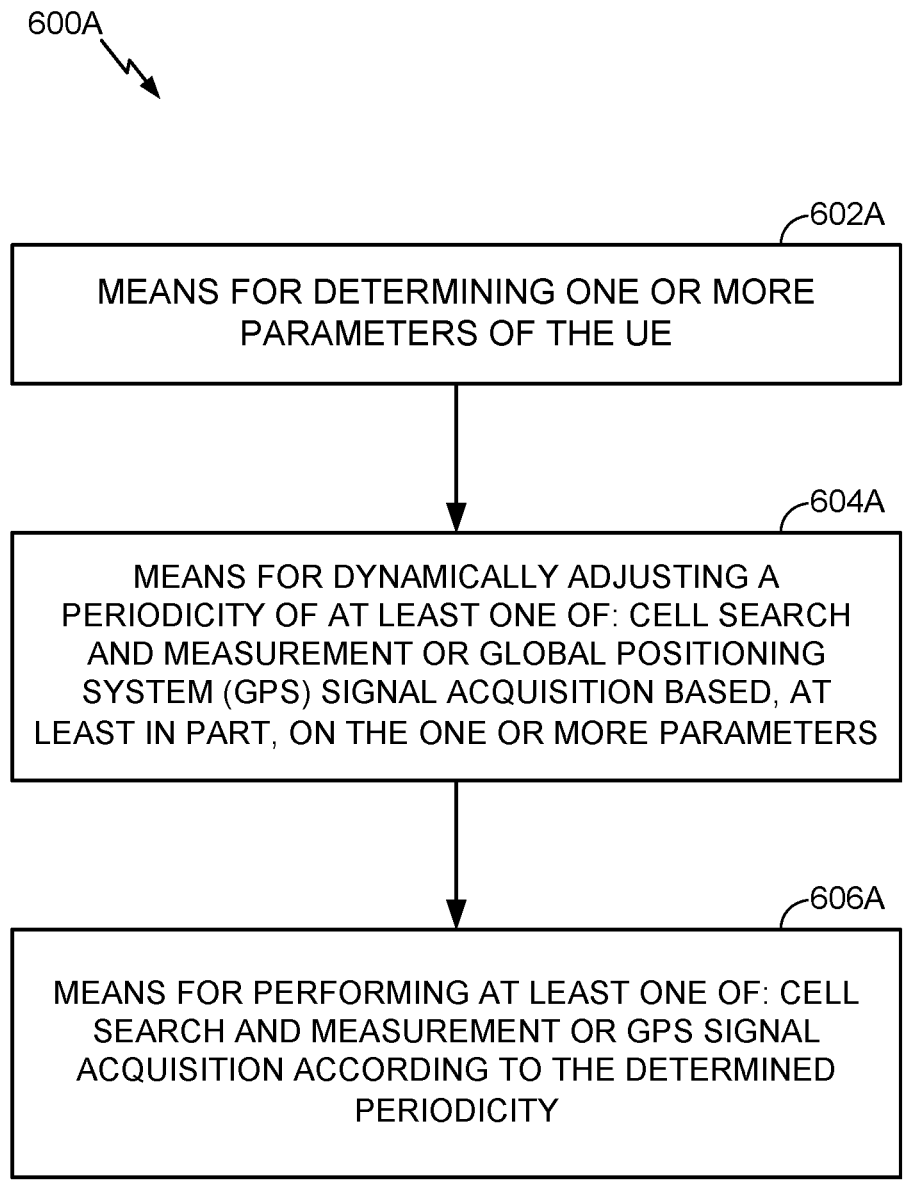
FIG. 6A illustrates example components capable of performing the operations illustrates in FIG. 6, in accordance with certain aspects of the present disclosure.

Means for dynamically adjusting a frequency of at least one of: search and measurement or GPS signal acquisition based, at least in part, on the one or more parameters, as illustrated in block 604A of FIG. 6A, may include a module for increasing or decreasing a periodicity that the UE performs cell search and measurements and/or GPS signal acquisition. The means for dynamically adjusting may include modules for comparing the one or more parameters to various thresholds, modules for determining durations associated with the parameters, and/or modules for determining periodicities based on the whether the thresholds are satisfied and the durations.

Means for performing at least one of: cell search and measurement or GPS signal acquisition according to the determined periodicity, as illustrated in block 606A of FIG. 6A, may include the GPS receiver of the UE for GPS signal acquisition and/or a receiver and processors of the UE for performing the cell search and measurements according to the determined periodicity.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display (e.g., touch screen), mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise.

According to certain aspects, such means may be implemented by processing systems configured to perform the corresponding functions by implementing various algorithms (e.g., in hardware or by executing software instructions).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, the instructions may be executed by a processor or processing system of the user terminal 120 or access point 110 and stored in a memory 282 of the user terminal 120 or memory 242 of the access point 110. For certain aspects, the computer program product may include packaging material.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications by a user equipment (UE), comprising:
   determining one or more parameters of the UE;
   dynamically adjusting a periodicity of at least one of cell search and measurements or satellite positioning system (SPS) signal acquisition based, at least in part, on an amount of battery life associated with the UE and a mobility state of the UE, wherein the adjusting comprises reducing the periodicity of the cell search and measurements when the amount of battery life associated with the UE fails to satisfy a threshold; and
   performing at least one of the cell search and measurements or SPS signal acquisition according to the adjusted periodicity.

2. The method of claim 1, wherein the dynamically adjusting is further based on at least one of a channel quality or a radio access technology (RAT) currently used by the UE for communicating.

3. The method of claim 2, wherein the adjusting comprises disabling SPS signal acquisition when the mobility state indicates that the UE is in a stationary state for a duration.

4. The method of claim 2, wherein:
   the RAT used by the UE for communicating comprises a wireless local area network (WLAN); and
   the adjusting comprises reducing the periodicity of the cell search and measurements when: the channel quality satisfies a threshold value and the mobility state indicates that the UE is in a stationary state for a duration.

5. The method of claim 2, wherein:
   the RAT used by the UE for communicating comprises a wireless wide area network (WWAN); and
   the adjusting comprises reducing the periodicity of the cell search and measurements when: the channel quality satisfies a first threshold value associated with a good channel quality or fails to satisfy a second threshold value associated with a poor channel quality, and the mobility state indicates that the UE is in a stationary state for a duration.

6. The method of claim 1, wherein the adjusting comprises:
   reducing the periodicity of the cell search and measurements when the mobility state indicates that the UE is in a stationary state for a duration.

7. The method of claim 1, wherein:
   the mobility state indicates that the UE is in a stationary state for a duration; and
   the adjusting is further based on the duration.

8. The method of claim 7, wherein for longer durations of the stationary state, lower periodicities are selected for the cell search and measurements.

9. The method of claim 1, wherein the mobility state of the UE is determined based, at least in part, on a motion sensor measurement associated with the UE.

10. The method of claim 9, further comprising:
    measuring at least a filtered frequency error associated with the UE, wherein the mobility state of the UE is determined further based on the measured filtered frequency error.

11. The method of claim 10, further comprising:
    determining the UE is in a stationary state when the measured filtered frequency error satisfies a threshold value.

12. An apparatus for wireless communications by a user equipment (UE), comprising:
    means for determining one or more parameters of the UE;
    means for dynamically adjusting a periodicity of at least one of cell search and measurements or satellite positioning system (SPS) signal acquisition based, at least in part, on an amount of battery life associated with the UE and a mobility state of the UE, wherein the means for adjusting comprises means for reducing the periodicity of the cell search and measurements when the amount of battery life associated with the UE fails to satisfy a threshold; and
    means for performing at least one of the cell search and measurements or SPS signal acquisition according to the adjusted periodicity.

13. The apparatus of claim 12, wherein the dynamically adjusting is further based on at least one of a channel quality or a radio access technology (RAT) currently used by the UE for communicating.

14. The apparatus of claim 13, wherein the means for adjusting comprises means for disabling SPS signal acquisition when the mobility state indicates that the UE is in a stationary state for a duration.

15. The apparatus of claim 13, wherein:
    the RAT used by the UE for communicating comprises a wireless local area network (WLAN); and
    the means for adjusting comprises means for reducing the periodicity of the cell search and measurements when the channel quality satisfies a threshold value and the mobility state indicates that the UE is in a stationary state for a duration.

16. The apparatus of claim 13, wherein:
    the RAT used by the UE for communicating comprises a wireless wide area network (WWAN); and
    the means for adjusting comprises means for reducing the periodicity of the cell search and measurements when the channel quality satisfies a first threshold value associated with a good channel quality or fails to satisfy a second threshold value associated with a poor channel quality and the mobility state indicates that the UE is in a stationary state for a duration.

17. The apparatus of claim 12, wherein the means for adjusting comprises:
    means for reducing the periodicity of the cell search and measurements when the mobility state indicates that the UE is in a stationary state for a duration.

18. The apparatus of claim 12, wherein:
    the mobility state indicates that the UE is in a stationary state for a duration; and
    the adjusting is further based on the duration.

19. The apparatus of claim 18, wherein for longer durations of the stationary state, lower periodicities are selected for the cell search and measurements.

20. The apparatus of claim 12, wherein the mobility state of the UE is determined based, at least in part, on a motion sensor measurement associated with the UE.

21. The apparatus of claim 20, further comprising:
    means for measuring at least a filtered frequency error associated with the UE, wherein the mobility state of the UE is determined further based on the measured filtered frequency error.

22. The apparatus of claim 21, further comprising:
    means for determining the UE is in a stationary state when the measured filtered frequency error satisfies a threshold value.

23. An apparatus for wireless communications by a user equipment (UE), comprising:

at least one processor configured to:
  determine one or more parameters of the UE;
  dynamically adjust a periodicity of at least one of cell search and measurements or satellite positioning system (SPS) signal acquisition based, at least in part, on an amount of battery life associated with the UE and a mobility state of the UE, wherein the adjusting comprises reducing the periodicity of the cell search and measurements when the amount of battery life associated with the UE fails to satisfy a threshold; and
  perform at least one of the cell search and measurements or SPS signal acquisition according to the adjusted periodicity; and
a memory coupled with the at least one processor.

24. A non-transitory computer readable medium having computer executable code stored thereon for wireless communications by a user equipment (UE), comprising:
  code for determining one or more parameters of the UE;
  code for dynamically adjusting a periodicity of at least one of cell search and measurements or satellite positioning system (SPS) signal acquisition based, at least in part, on an amount of battery life associated with the UE and a mobility state of the UE, wherein the adjusting comprises reducing the periodicity of the cell search and measurements when the amount of battery life associated with the UE fails to satisfy a threshold; and
  code for performing at least one of the cell search and measurements or SPS signal acquisition according to the adjusted periodicity.

* * * * *